(12) United States Patent
Akihisa et al.

(10) Patent No.: US 8,276,554 B2
(45) Date of Patent: Oct. 2, 2012

(54) SPARK IGNITION TYPE INTERNAL COMBUSTION ENGINE

(75) Inventors: Daisuke Akihisa, Susono (JP); Daisaku Sawada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 384 days.

(21) Appl. No.: 12/672,186

(22) PCT Filed: Nov. 5, 2008

(86) PCT No.: PCT/JP2008/070531
§ 371 (c)(1),
(2), (4) Date: Feb. 4, 2010

(87) PCT Pub. No.: WO2009/060976
PCT Pub. Date: May 14, 2009

(65) Prior Publication Data
US 2010/0282215 A1   Nov. 11, 2010

(30) Foreign Application Priority Data

Nov. 6, 2007   (JP) ................................. 2007-288541

(51) Int. Cl.
*F02B 75/04* (2006.01)
*F01L 1/34* (2006.01)
(52) U.S. Cl. ................. 123/48 R; 123/78 R; 123/90.15; 701/103

(58) Field of Classification Search ....... 123/48 R–48 D, 123/78 R–78 F, 90.15–90.18; 701/103
See application file for complete search history.

(56) References Cited

FOREIGN PATENT DOCUMENTS

| JP | A-2004-218522 | 8/2004 |
| JP | A-2007-71046 | 3/2007 |
| JP | A-2007-239550 | 9/2007 |

OTHER PUBLICATIONS

International Search Report mailed on Dec. 22, 2008 in corresponding International Application No. PCT/JP2008/070531.
Oct. 1, 2009 International Preliminary Report on Patentability issued in Application No. PCT/JP2008/070531 (English Translation only).

*Primary Examiner* — Noah Kamen
(74) *Attorney, Agent, or Firm* — Oliff & Berridge, PLC

(57) ABSTRACT

In an internal combustion engine, a variable compression ratio mechanism (A) able to change a mechanical compression ratio and a variable valve timing mechanism (B) able to control the closing timing of an intake valve (7) are provided. The mechanical compression ratio is held at a maximum mechanical compression ratio at the engine low load operation side and gradually made to decrease as the engine load increases at the engine high load operation side. Combustion is performed by a stoichiometric air-fuel ratio at the engine high load operation side, and combustion is performed by a lean air-fuel ratio at the engine low load operation side where the mechanical compression ratio becomes the maximum mechanical compression ratio.

5 Claims, 15 Drawing Sheets

Fig.6
(A)
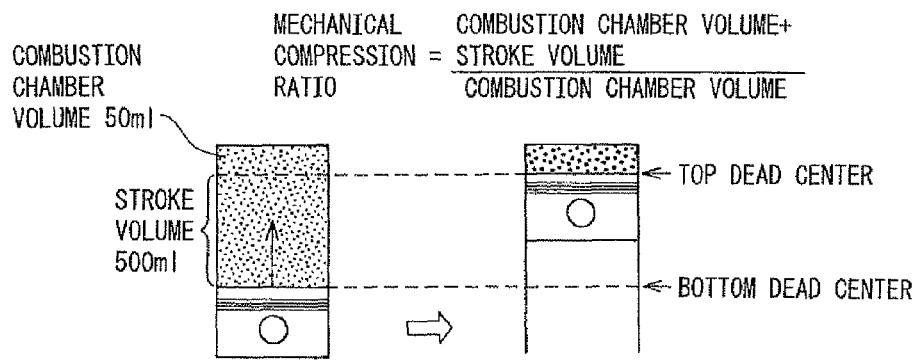
(B)
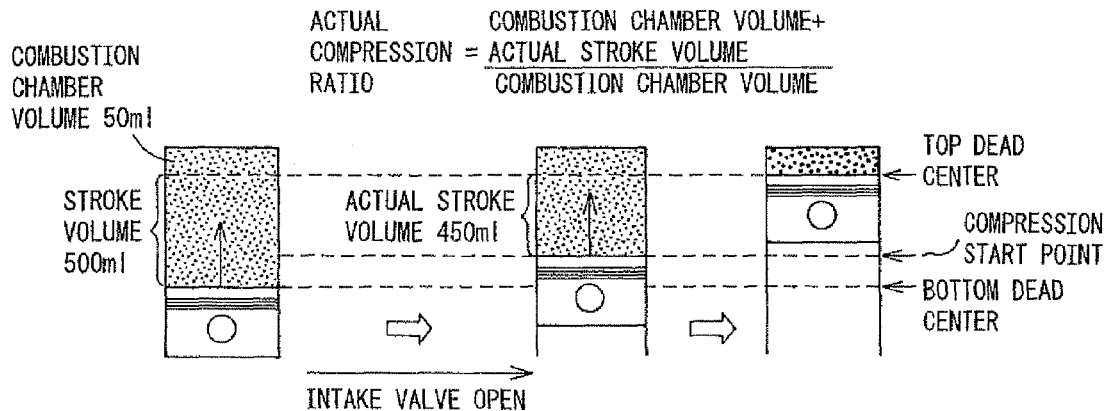
(C)
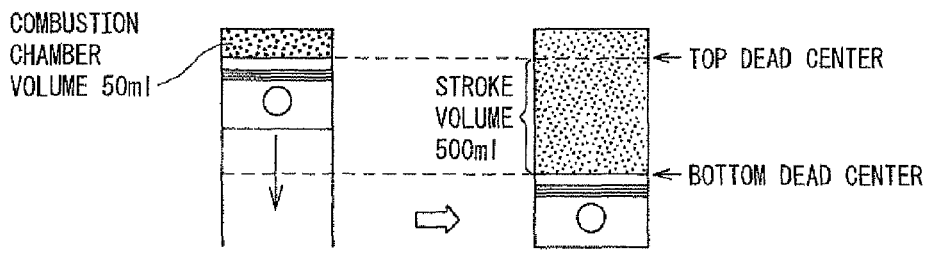

Fig.14
(A)
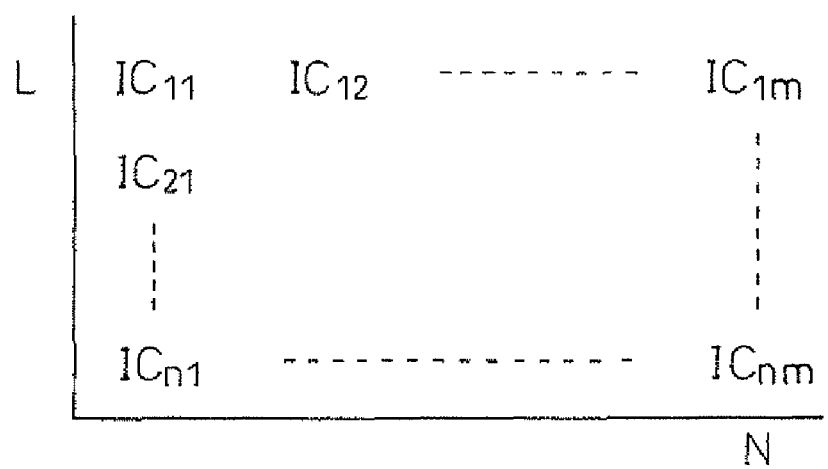
(B)
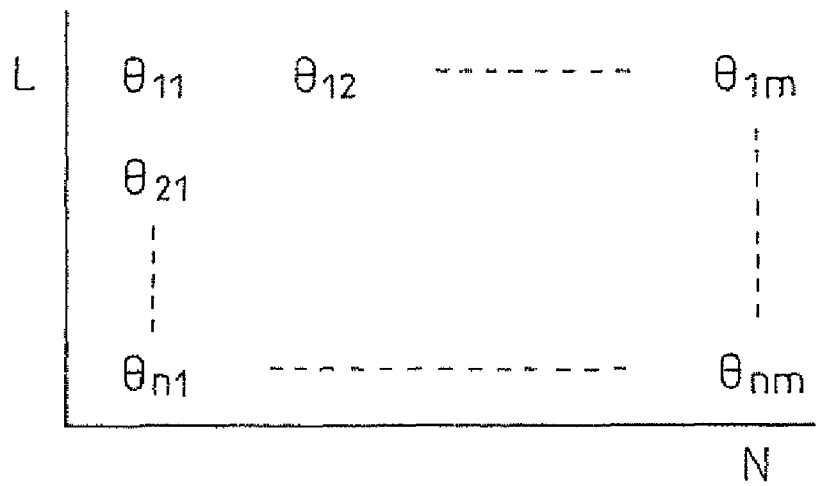

$L$ | $\theta'_{11}$  $\theta'_{12}$  --------  $\theta'_{1m}$
     $\theta'_{21}$
       ⋮                                   ⋮
     $\theta'_{n1}$  ---------------  $\theta'_{nm}$
                                              $N$

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve timing mechanism able to control a closing timing of an intake valve, performing a supercharging action by a supercharger at the time of engine medium load operation and engine high load operation, and increasing the mechanical compression ratio and delaying the closing timing of the intake valve as the engine load becomes lower at the time of engine medium and high load operation in the state holding the actual combustion ratio constant (for example, see Japanese Patent Publication (A) No. 2004-218522).

However, as will be explained in detail later, it has been found that in such internal combustion engines, the air-fuel ratio at which the thermal efficiency becomes high differs according to the mechanical compression ratio, accordingly, to raise the thermal efficiency, it is necessary to appropriately select an air-fuel ratio according to the mechanical compression ratio. However, the above-mentioned document does not allude at all to this.

DISCLOSURE OF THE INVENTION

An object of the present invention is to provide a spark ignition type internal combustion engine enabling acquisition of a high thermal efficiency in consideration of the fact that the air-fuel ratio at which the thermal efficiency becomes high differs according to mechanical compression ratio.

According to the present invention, there is provided a spark ignition type internal combustion engine provided with a variable compression ratio mechanism able to change a mechanical compression ratio and a variable valve timing mechanism able to control a closing timing of an intake valve, wherein the mechanical compression ratio is made higher at an engine low load operation side than at a time of engine high load operation, the mechanical compression ratio is gradually reduced at an engine high load operation side as the engine load becomes higher, combustion by a first air-fuel ratio and combustion by a second air-fuel ratio larger than the first air-fuel ratio are selectively performed, combustion by the second air-fuel ratio is prohibited at the engine high load operation side, and combustion by the second air-fuel ratio is allowed at the engine low load operation side.

That is, in the present invention, in order to improve the thermal efficiency, a first air-fuel ratio with a high thermal efficiency is employed at the engine high load operation side, and use of a second air-fuel ratio with a high thermal efficiency is allowed at the engine low load operation side.

BRIEF DESCRIPTION OF THE DRAWINGS

FIG. 6 is a view for explaining the mechanical compression ratio, actual compression ratio, and expansion ratio.

FIG. 14 is a view of a map of the closing timing of an intake valve.

FIG. 15 is a view of a map of the closing timing of an intake valve, etc.

BEST MODE FOR CARRYING OUT THE INVENTION

Figure 1:
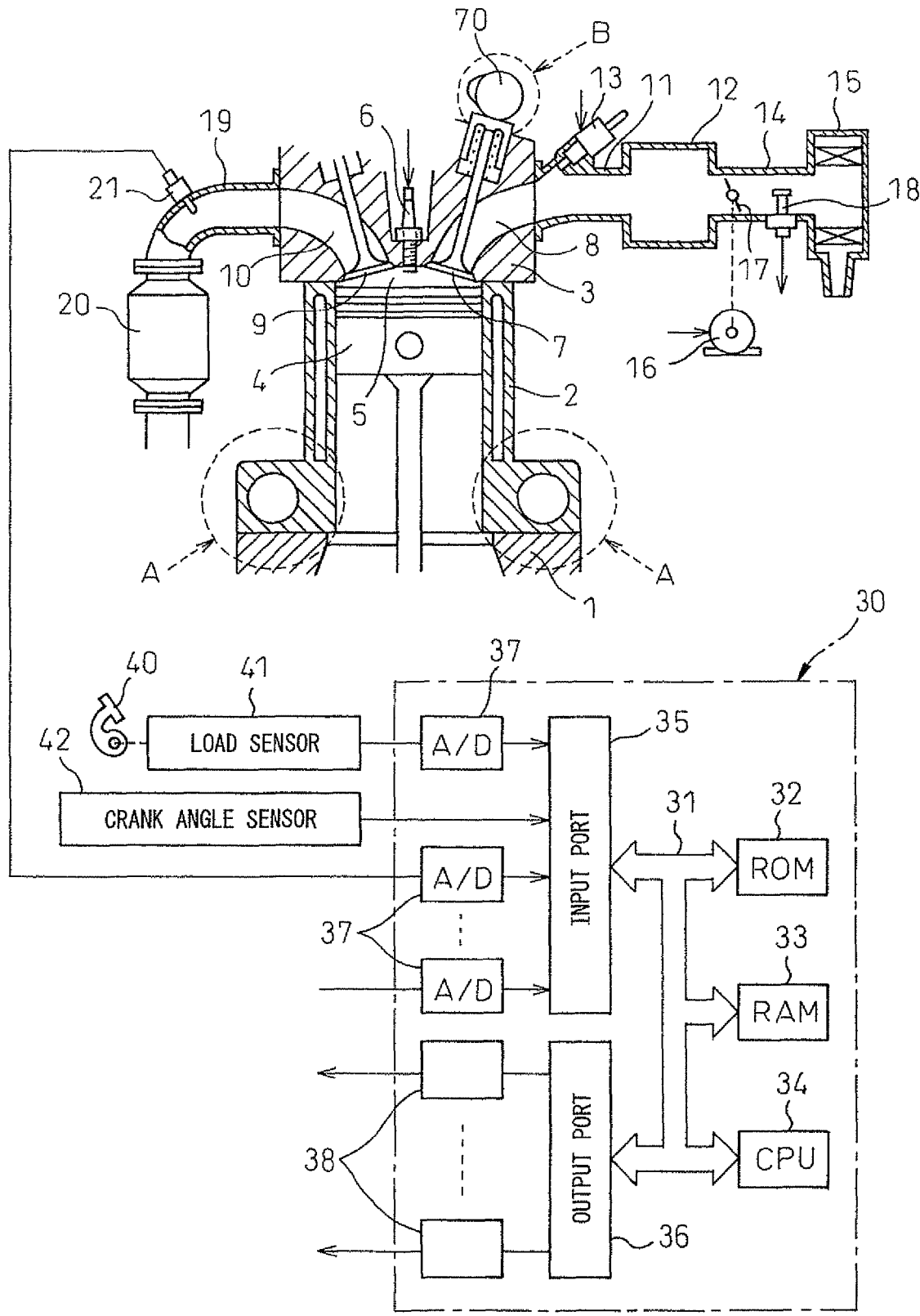
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing for example a three-way catalyst, while the exhaust manifold 19 is provided inside it with an air-fuel ratio sensor 21.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with an actual compression action start timing changing mechanism B able to change a start timing of an actual compression action. Note that in the embodiment shown in FIG. 1, this actual compression action start timing changing mechanism B is comprised of a variable valve timing mechanism able to control the closing timing of the intake valve 7.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18 and the output signal of the air-fuel ratio sensor 21 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 16, variable compression ratio mechanism A, and variable valve timing mechanism B.

Figure 2:
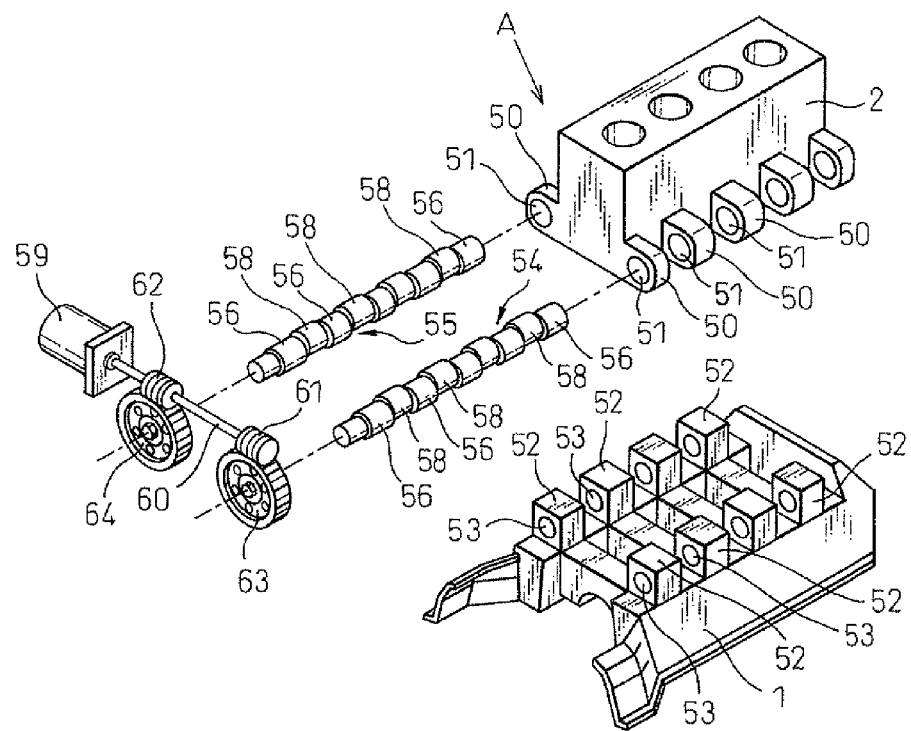
FIG. 2 is a disassembled perspective view of a variable compression ratio mechanism.
Figure 3:
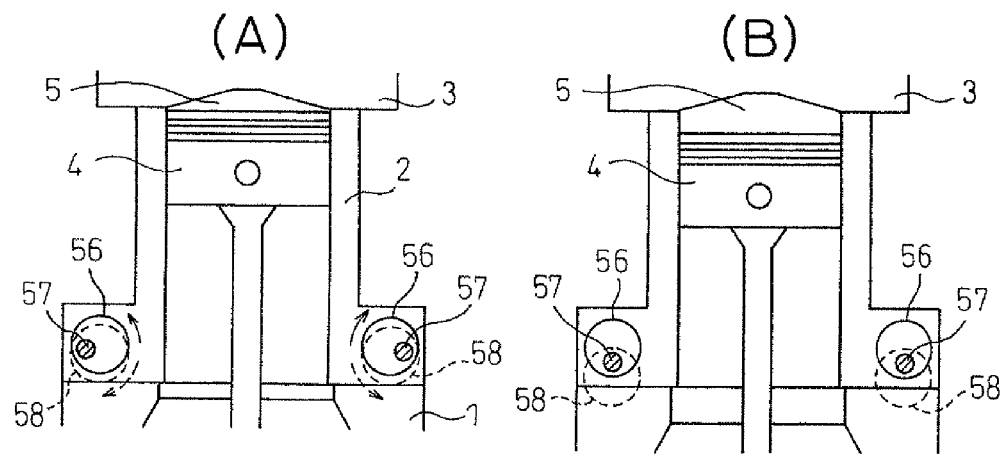
FIG. 3 is a side cross-sectional view of the illustrated internal combustion engine.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned as compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
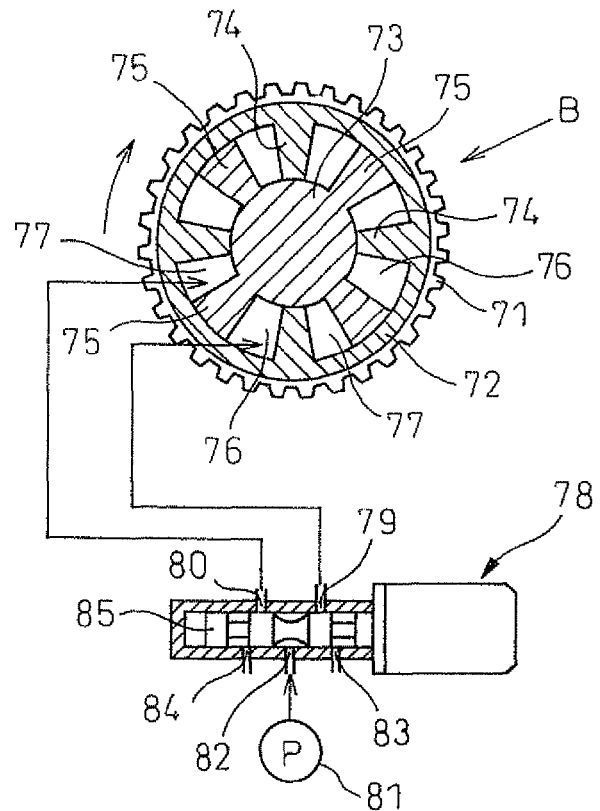
FIG. 4 is a view of a variable valve timing mechanism.

On the other hand, FIG. 4 shows a variable valve timing mechanism B attached to the end of the cam shaft 70 for driving the intake valve 7 in FIG. 1. Referring to FIG. 4, this variable valve timing mechanism B is provided with a timing pulley 71 rotated by an engine crank shaft through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and hydraulic chambers for retarding 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84 and a spool valve 85 for controlling connection and disconnection of the ports 79, 80, 82, 83, 84.

To advance the phase of the cams of the intake valve drive cam shaft 70, in FIG. 4, the spool valve 85 is made to move to the right, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 4, the spool valve 85 is made to move to the left, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
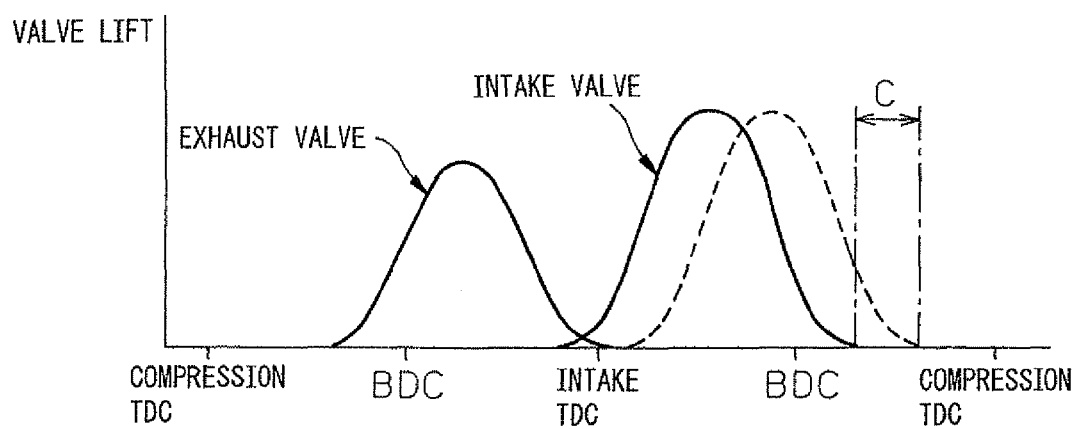
FIG. 5 is a view showing the amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line in FIG. 5 and the range shown by the broken line, therefore the closing timing of the intake valve 7 can be set to any crank angle in the range shown by the arrow C in FIG. 5.

The variable valve timing mechanism B shown in FIG. 1 and FIG. 4 is one example. For example, a variable valve timing mechanism or other various types of variable valve timing mechanisms able to change only the closing timing of the intake valve while maintaining the opening timing of the intake valve constant can be used.

Next, the meaning of the terms used in the present application will be explained with reference to FIG. 6. Note that FIGS. 6(A), (B), and (C) show for explanatory purposes an engine with a volume of the combustion chambers of 50 ml and a stroke volume of the piston of 500 ml. In these FIGS. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by (combustion chamber volume+stroke volume)/combustion chamber volume. In the example shown in FIG. 6(C), this expansion ratio becomes (50 ml+500 ml)/50 ml=11.

Next, the most basic features of the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle used selectively in accordance with the load in the present invention.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIGS. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
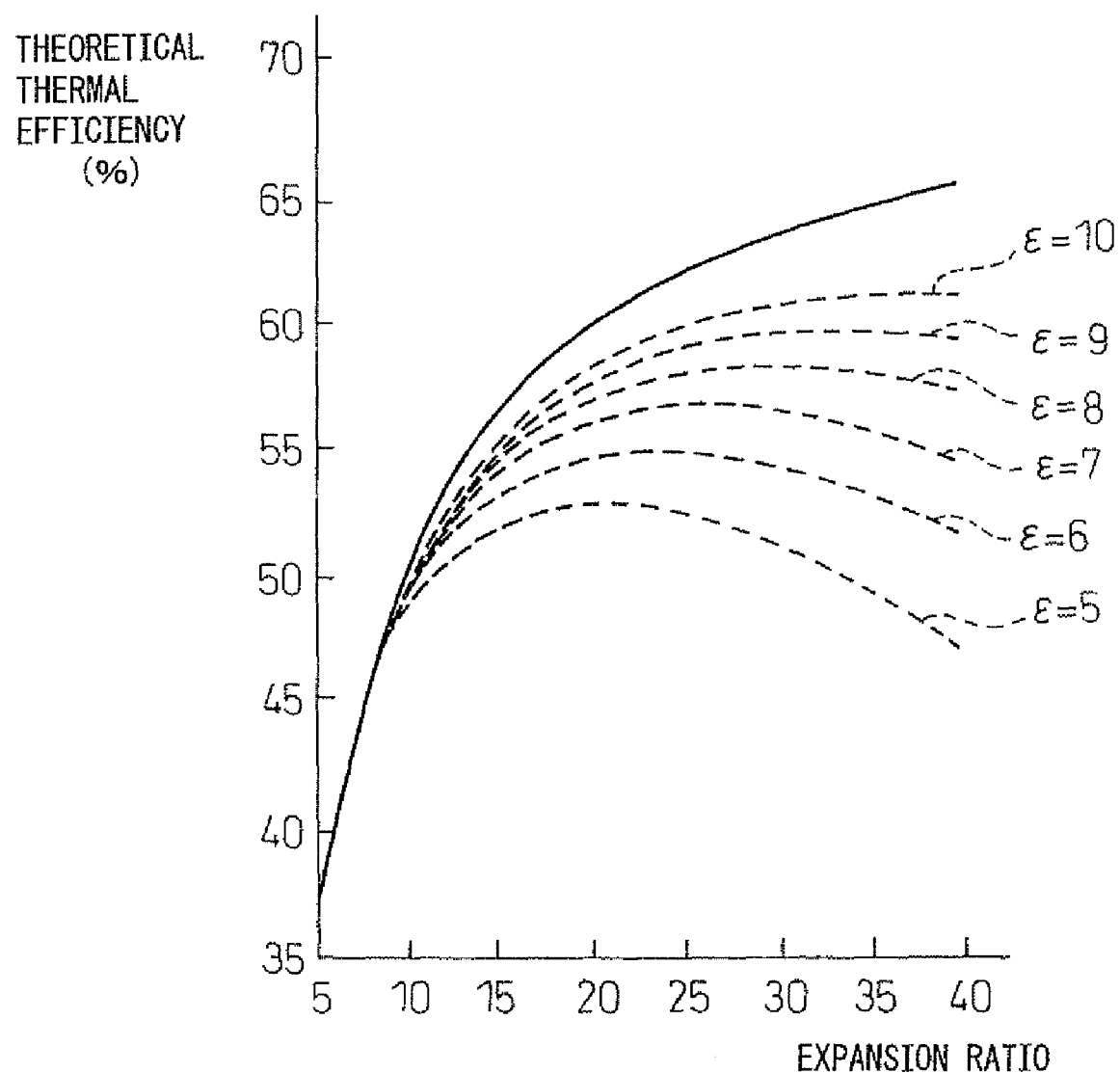
FIG. 7 is a view showing the relationship between the theoretical thermal efficiency and expansion ratio.
Figure 8:
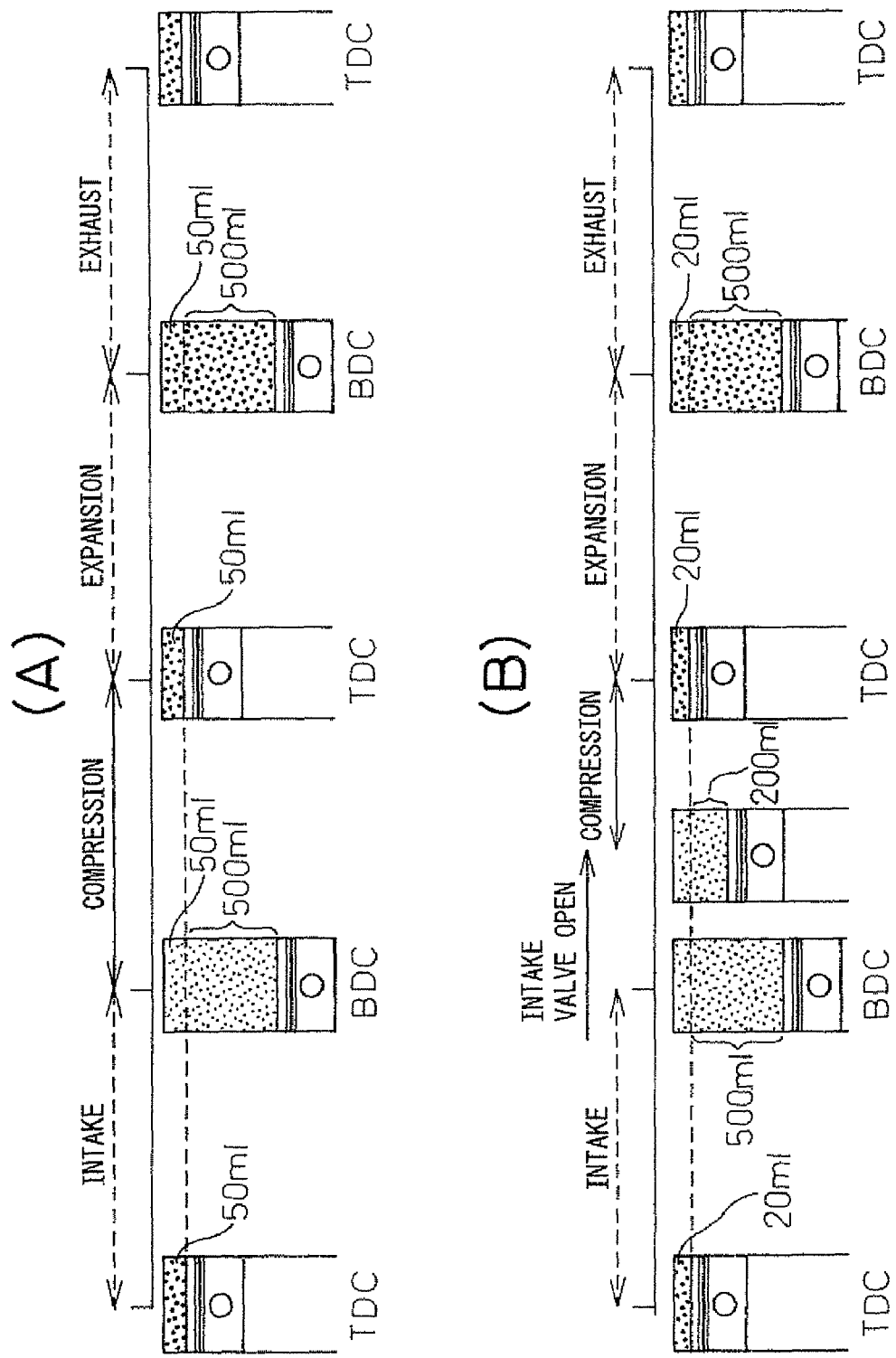
FIG. 8 is a view for explaining an ordinary cycle and superhigh expansion ratio cycle.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line $\epsilon=10$ in FIG. 7 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual compression ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8(A), as explained above, the actual compression ratio is about 11 and the expansion ratio is 11. Compared with this case, in the case shown in FIG. 8(B), it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is set, while at the time of engine high load operation, the ordinary cycle shown in FIG. 8(A) is set.

Next, the operational control as a whole will be explained with reference to FIG. 9.

Figure 9:
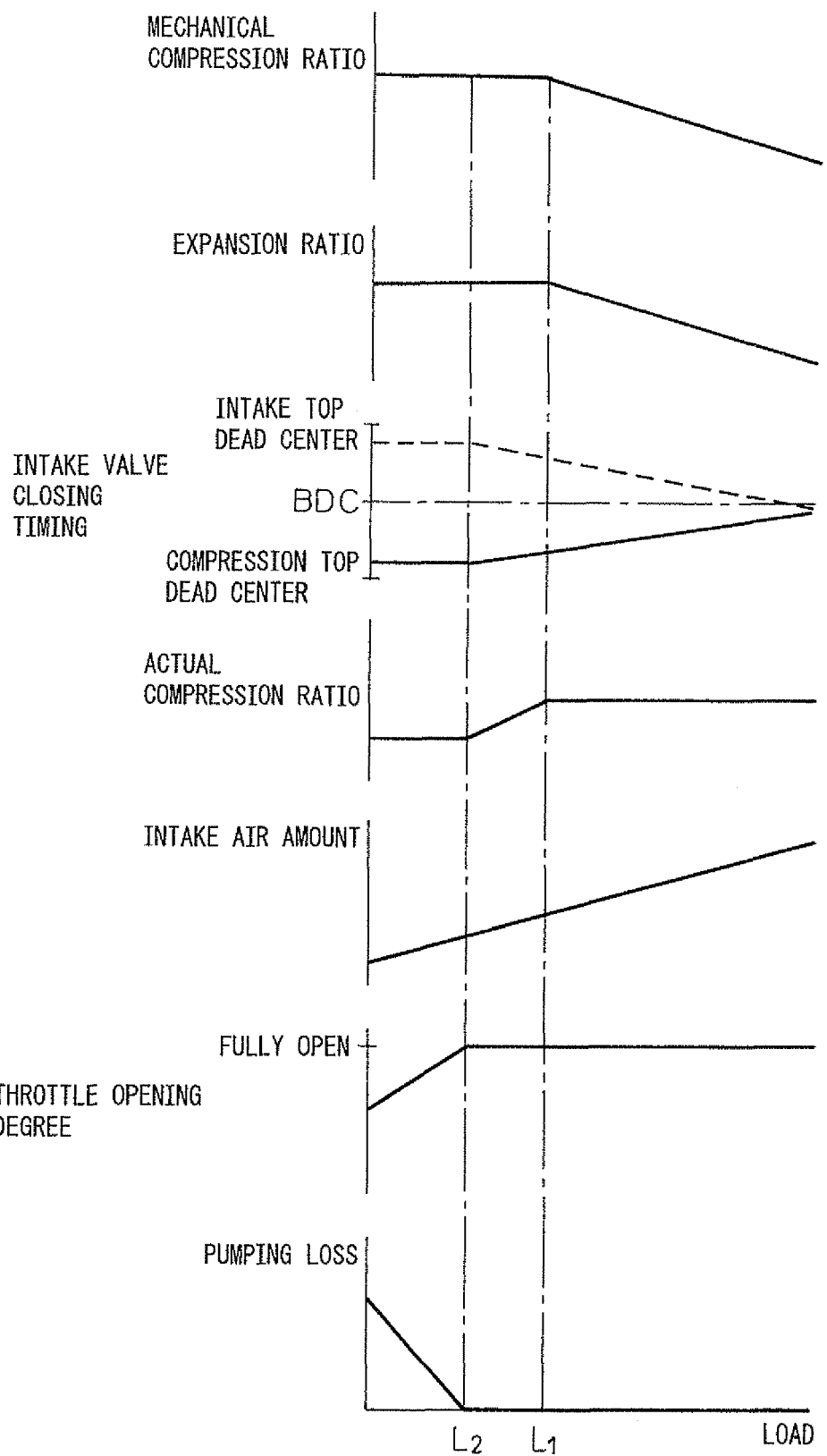
FIG. 9 is a view showing the change in mechanical compression ratio etc. in accordance with the engine load.

FIG. 9 shows the changes in the mechanical compression ratio, expansion ratio, closing timing of the intake valve 7, actual compression ratio, the amount of intake air, opening degree of the throttle valve 17, and pumping loss along with the engine load under a certain engine speed. Note that FIG. 9 illustrates the case where the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_x$ in the exhaust gas.

Now, as explained above, at the time of engine high load operation, the ordinary cycle shown in FIG. 8(A) is executed. Therefore, as shown in FIG. 9, at this time, since the mechanical compression ratio is made low, the expansion ratio becomes low. As shown by the solid line in low in FIG. 9, the closing timing of the intake valve 7 is advanced as shown by the solid line in FIG. 5. Further, at this time, the amount of intake air is large. At this time, the opening degree of the throttle valve 17 is maintained fully opened or substantially fully opened, so the pumping loss becomes zero.

On the other hand, as shown by the solid line in FIG. 9, when the engine load becomes lower, the closing timing of the intake valve 7 is retarded so as to reduce the intake air amount along with that. Further, at that time, the mechanical compression ratio is increased as the engine load becomes lower as shown in FIG. 9 so that the actual compression ratio is maintained substantially constant. Therefore, the expansion ratio is also increased as the engine load becomes lower. Note that at this time as well, the throttle valve 17 is held in the fully open or substantially fully open state. Therefore, the intake air amount fed into the combustion chamber 5 is controlled by changing the closing timing of the intake valve 7 without relying on the throttle valve 17. At this time as well, the pumping loss becomes zero.

In this way, when the engine load becomes lower from the engine high load operation state, the mechanical compression ratio is made to increase along with the reduction in the intake air amount under a substantially constant actual compression ratio. That is, the volume of the combustion chamber 5 when the piston 4 reaches compression top dead center is reduced proportionally to the reduction in the intake air amount. Therefore, the volume of the combustion chamber 5 when the piston 4 reaches compression top dead center changes in proportion to the intake air amount. Note that the air-fuel ratio in the combustion chamber 5 at this time in the example shown in FIG. 9 becomes stoichiometric, so the volume of the combustion chamber 5 when the piston 4 reaches compression top dead center changes in proportion to the fuel amount.

If the engine load becomes further lower, the mechanical compression ratio is further made to increase. When the engine load falls to the medium load $L_1$ closer to low load, the mechanical compression ratio reaches the limit mechanical compression ratio constituting the structural limit of the combustion chamber 5. In the region of a load lower than the engine load $L_1$ where the mechanical compression ratio reaches the limit mechanical compression ratio, the mechanical compression ratio is held at the limit mechanical compression ratio. Therefore, at the time of low load side engine medium load operation and at the time of engine low load operation, i.e, at the engine low load operation side the mechanical compression ratio becomes maximum and the expansion ratio also becomes maximum. In other words, at the engine low load operation side, the mechanical compression ratio is made maximum so that the maximum expansion ratio is obtained.

On the other hand, in the embodiment shown in FIG. 9, even when the engine load becomes lower than $L_1$, as shown by the solid line in FIG. 9, the closing timing of the intake valve 7 is retarded as the engine load becomes lower. When the engine load falls to $L_2$, the closing timing of the intake valve 7 becomes the limit closing timing where the intake air amount fed into the combustion chamber 5 can be controlled. When the closing timing of the intake valve 7 reaches the limit closing timing, in the region of a load lower than the engine load $L_2$ when the closing timing of the intake valve 7 reaches the limit closing timing, the closing timing of the intake valve 7 is held at the limit closing timing.

When the closing timing of the intake valve 7 is held at the limit closing timing, the intake air amount no longer can be controlled by changing the closing timing of the intake valve 7. In the embodiment shown in FIG. 9, at this time, that is, in the region of a load lower than the engine load $L_2$ where the closing timing of the intake valve 7 reaches the limit closing timing, the intake air amount fed into the combustion chamber 5 is controlled by the throttle valve 17. However, if the intake air amount is controlled by the throttle valve 17, the pumping loss increases as shown in FIG. 9.

On the other hand, as shown in FIG. 9, at the engine high load operation side where the engine load is higher than $L_1$, the actual compression ratio is maintained at substantially the same actual compression ratio for the same engine speed. As opposed to this, when the engine load is lower than $L_2$, that is, when a mechanical compression ratio is held at a limit mechanical compression ratio, the actual compression ratio is determined by the closing timing of the intake valve 7. If the closing timing of the intake valve 7 is retarded in a state that the engine load falls between $L_1$ and $L_2$, the actual compression ratio falls. If the closing timing of the intake valve 7 is held at the limit closing timing as in an operating region with engine load lower than $L_2$, the actual compression ratio is maintained constant.

Figure 10:
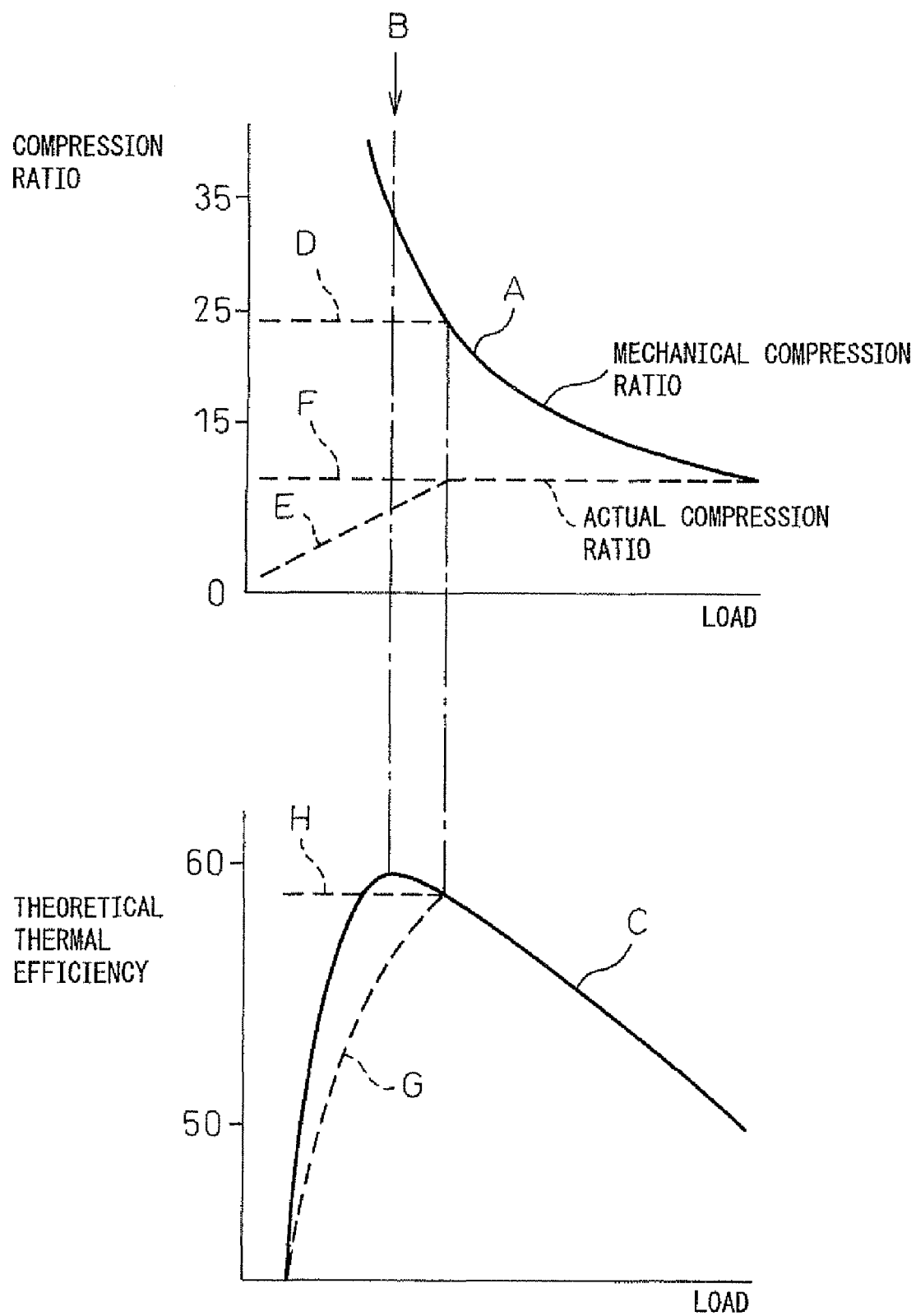
FIG. 10 is a view explaining the theoretical thermal efficiency.

Next, the theoretical thermal efficiency and net thermal efficiency will be explained with reference to FIG. 10 and FIG. 11. In FIG. 10, the solid line A shows a case when the mechanical compression ratio is enlarged without limit. When the mechanical compression ratio A becomes larger, that is, when the expansion ratio becomes larger, at the end of the expansion stroke, that is, at the time of exhaust valve 9 opening, the pressure in the combustion chamber 5 gradually falls and becomes atmospheric pressure in the end. This is shown by B in FIG. 10.

On the other hand, in FIG. 10, the solid line C shows the change in the theoretical thermal efficiency when the mechanical compression ratio A is enlarged without limit. As shown in FIG. 10, the theoretical thermal efficiency C increases with the increase of the mechanical compression ratio A, that is, increases with the increase of the expansion ratio, but this theoretical air-fuel ratio C drops if the point B is exceeded. That is, if the mechanical compression ratio A exceeds the point B, the pressure in the combustion chamber at the end of the expansion stroke will become no less than the atmospheric pressure, resulting in the theoretical thermal efficiency C falling.

Therefore, to obtain high thermal efficiency, it is necessary to keep the mechanical compression ratio A from greatly exceeding the point B, so the normal maximum mechanical compression ratio is made a value that does not exceed the point B. Additionally in the example shown in FIG. 10, the maximum mechanical compression ratio is made a value shown by the broken line D.

On the other hand, in FIG. 10, the broken line E shows the change in the actual compression ratio when controlling the intake air amount by changing the closing timing of the intake valve 7 at a time where the mechanical compression ratio A becomes the maximum mechanical compression ratio D, and the broken line F shows the change in the actual compression ratio when controlling the intake air amount with the throttle valve 17 at a time where the mechanical compression ratio A becomes the maximum mechanical compression ratio D.

Further, in FIG. 10, the broken line G shows the change in the theoretical air-fuel ratio when controlling the intake air amount by changing the closing timing of the intake valve 7 when the mechanical compression ratio A becomes the maximum mechanical compression ratio D, and the broken line H shows the change in the theoretical air-fuel ratio when controlling the intake air amount with the throttle valve 17 when the mechanical compression ratio A becomes the maximum mechanical compression ratio D.

When controlling the intake air amount by changing the closing timing of the intake valve 7, the lower the engine load, the lower the actual compression ratio E, so the lower the engine load, the lower the theoretical thermal efficiency G. As opposed to this, when controlling the intake air amount with the throttle valve 17, the actual compression ratio F is held constant regardless of the engine load, so the theoretical thermal efficiency H is held constant regardless of the engine load.

Figure 11:
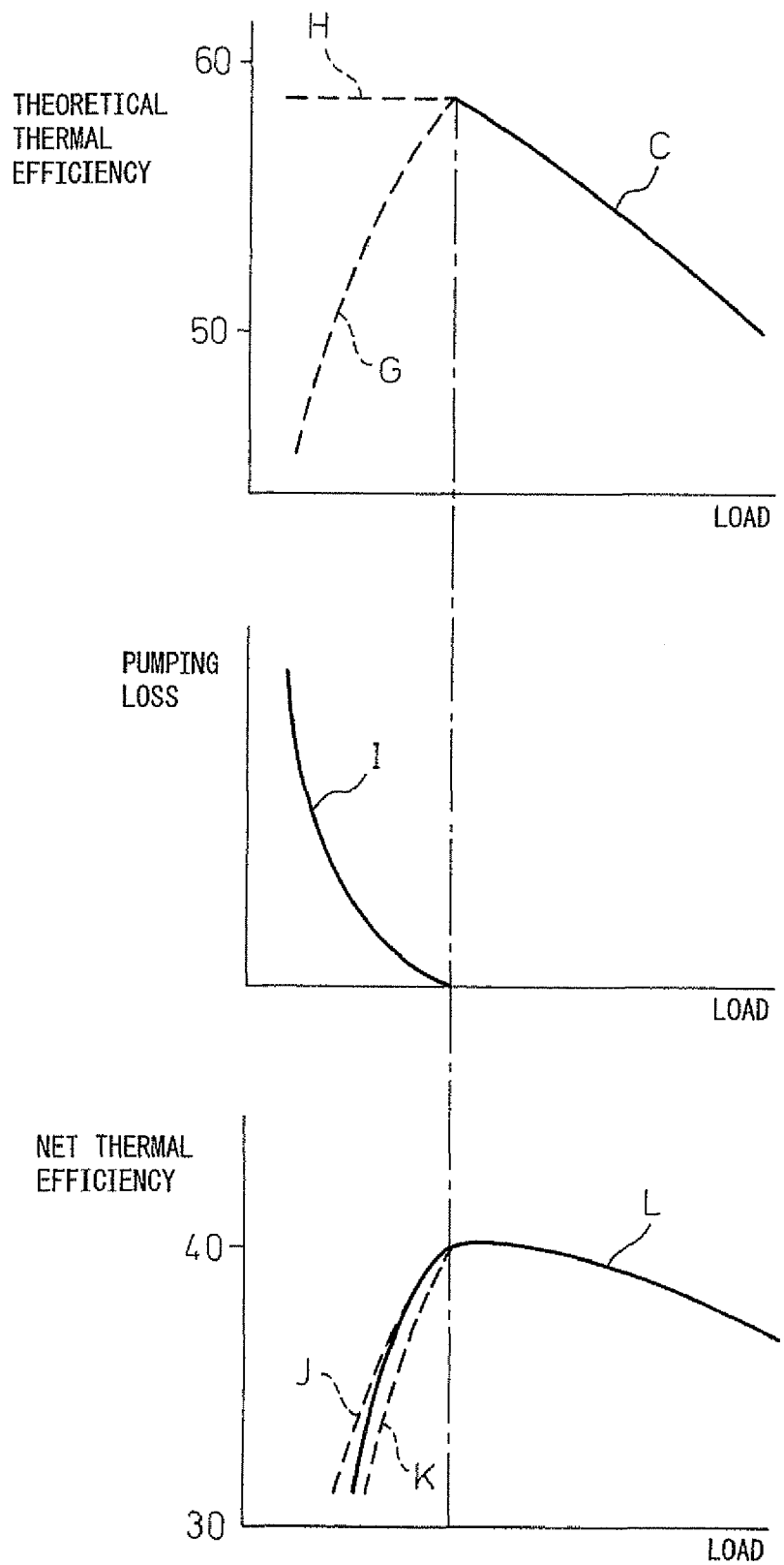
FIG. 11 is a view explaining the net thermal efficiency.

FIG. 11 shows, in addition to the theoretical thermal efficiency shown in FIG. 10, the pumping loss and net thermal efficiency. When the mechanical compression ratio is held at the maximum mechanical compression ratio D, the theoretical thermal efficiency H, when the throttle valve 17 is used to control the intake air amount, becomes higher than the theoretical thermal efficiency G. However, when the throttle valve 17 controls the intake air amount, pumping loss occurs as shown by I in FIG. 11.

If this pumping loss is taken into consideration, as shown in FIG. 11, the net thermal efficiency J, when controlling the intake air amount by changing the closing timing of the intake valve 7, becomes higher than the net thermal efficiency K when controlling the intake air amount by the throttle valve 17. In the example shown in FIG. 9, if the engine load drops when holding the mechanical compression ratio at the maximum mechanical compression ratio D, the control of the intake air amount switches from control by the closing timing of the intake valve 7 to control by the throttle valve 17 so the net thermal efficiency changes as shown by the solid line L.

Figure 12:
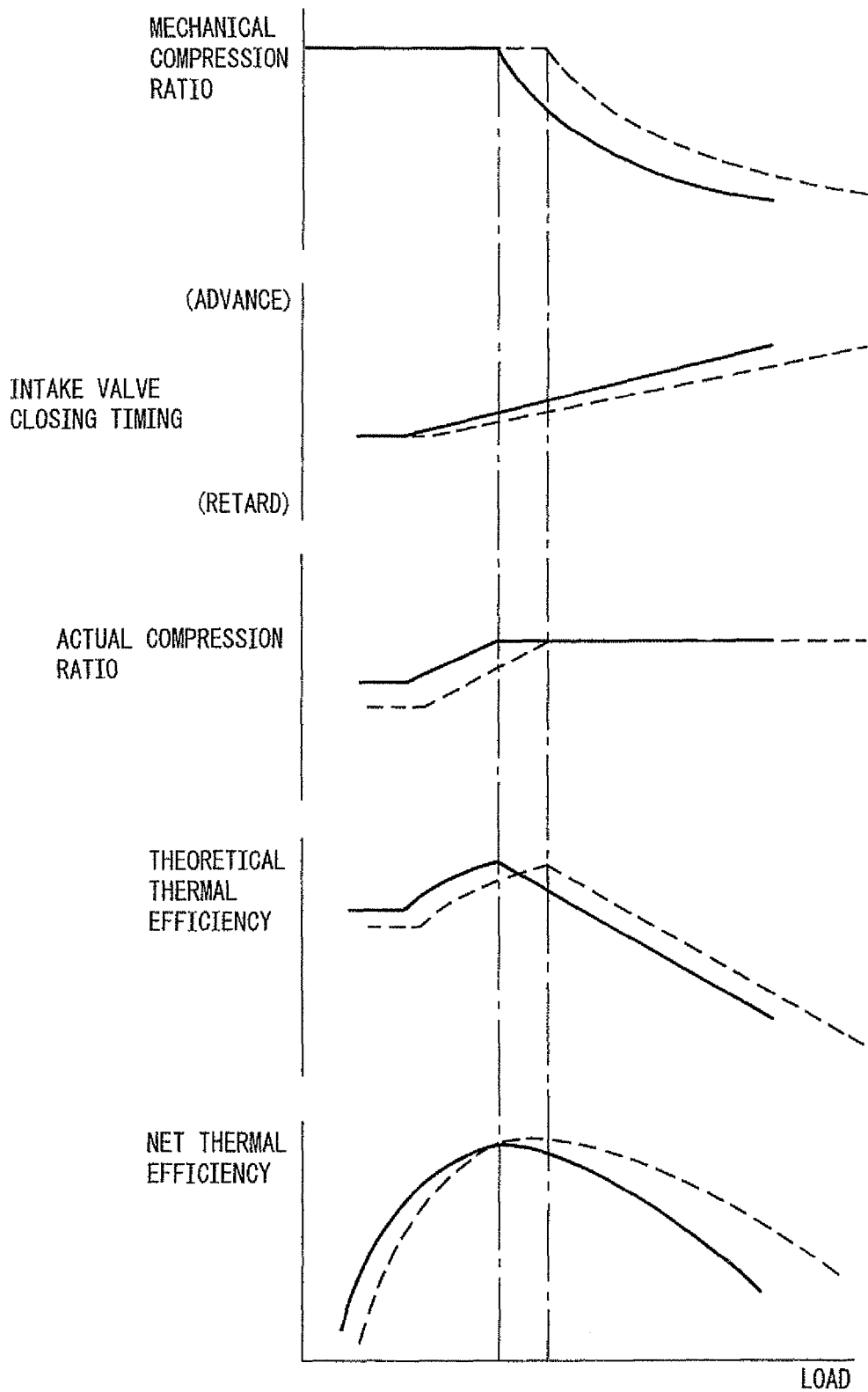
FIG. 12 is a view explaining the difference in the net thermal efficiency due to the difference in the air-fuel ratio.

FIG. 12 shows the changes in the mechanical compression ratio, intake valve 7 closing timing, actual compression ratio, theoretical thermal efficiency, and net thermal efficiency when performing combustion by a first air-fuel ratio and combustion by a second air-fuel ratio larger than the first air-fuel ratio. Note that, the first air-fuel ratio is for example stoichiometric and is shown by the broken line in FIG. 12, while the second air-fuel ratio is for example lean and is shown by the solid line in FIG. 12.

The example shown in FIG. 9 shows a case of stoichiometric air-fuel ratio combustion. Therefore, the changes in FIG. 11 shown by the broken line in the mechanical compression ratio, the closing timing of the intake valve 7, and the actual compression ratio are the same as the changes in FIG. 9 shown by the solid line in the mechanical compression, the closing timing of the intake valve 7, and the actual compression ratio. Note that, the changes, as shown by the broken line in FIG. 12, in the theoretical thermal efficiency and net thermal efficiency when combustion is performed under a stoichiometric air-fuel ratio are believed to be easily understood from the explanation based on FIG. 10 and FIG. 11.

Next, in FIG. 12, the load in the horizontal axis represents the fuel injection amount. If working on the assumption that the load is the same, that is, the fuel injection amount is the same when the air-fuel ratio is made stoichiometric and when it is made lean, the intake air amount when making it lean, must be more than when making it stoichiometric. Therefore, as shown in FIG. 12, with the same load, the closing timing of the intake valve 7 when the air-fuel ratio is lean, as shown by the solid line, is advanced in comparison to when the air-fuel ratio is stoichiometric, as shown by the broken line, so as to increase the intake air amount.

If the closing timing of the intake valve 7 is advanced, the actual compression ratio increases. Therefore, at this time, as shown in FIG. 12, at the engine high load operation side, in order to keep the actual compression ratio the same as when the air-fuel ratio is stoichiometric, the mechanical compression ratio when the air-fuel ratio is lean, as shown by the solid line, is made to drop more than when the air-fuel ratio is stoichiometric. If the mechanical compression ratio is made to drop, the expansion ratio falls, so, as shown by the solid line at FIG. 12, the theoretical thermal efficiency and net thermal efficiency drop. That is, at the engine high load operation side, the net thermal efficiency becomes higher when the air-fuel ratio is stoichiometric than when the air-fuel ratio is lean.

On the other hand, as mentioned above, when the mechanical compression ratio is held at the maximum mechanical compression ratio, the actual compression ratio drops the more the closing timing of the intake valve 7 is retarded. On the other hand, when the mechanical compression ratio is lower than the maximum mechanical compression ratio, the mechanical compression ratio changes so that the actual compression ratio is a fixed value despite whether the air-fuel ratio is stoichiometric or lean, so, as shown in FIG. 12, the change pattern of the mechanical compression ratio at the time of lean air-fuel ratio shifts more to the left than the change pattern of the mechanical compression ratio at the time of stoichiometric air-fuel ratio.

Therefore, as shown in FIG. 12, at the engine low load operation side where the mechanical compression ratio is the maximum mechanical compression ratio, under the same expansion ratio, the actual compression ratio at the time of the lean air-fuel ratio is higher than the actual compression ratio when the air-fuel ratio is stoichiometric. Therefore, at the engine low load operation side, the theoretical thermal efficiency and net thermal efficiency when the air-fuel ratio is lean are higher than when the air-fuel ratio is stoichiometric. Therefore, if considering the net thermal efficiency, prohibiting combustion by a lean air-fuel ratio, that is, a second air-fuel ratio, is preferable at the engine high load operation side, the second combustion can only be performed at the engine low load operation side.

Therefore, in the present invention, combustion by a first air-fuel ratio and combustion by a second air-fuel ratio larger than the first air-fuel ratio are selectively performed, combustion by the second air-fuel ratio is prohibited at the engine high load operation side, and combustion by the second air-fuel ratio is allowed when the mechanical compression ratio becomes the maximum mechanical compression ratio.

Figure 13:
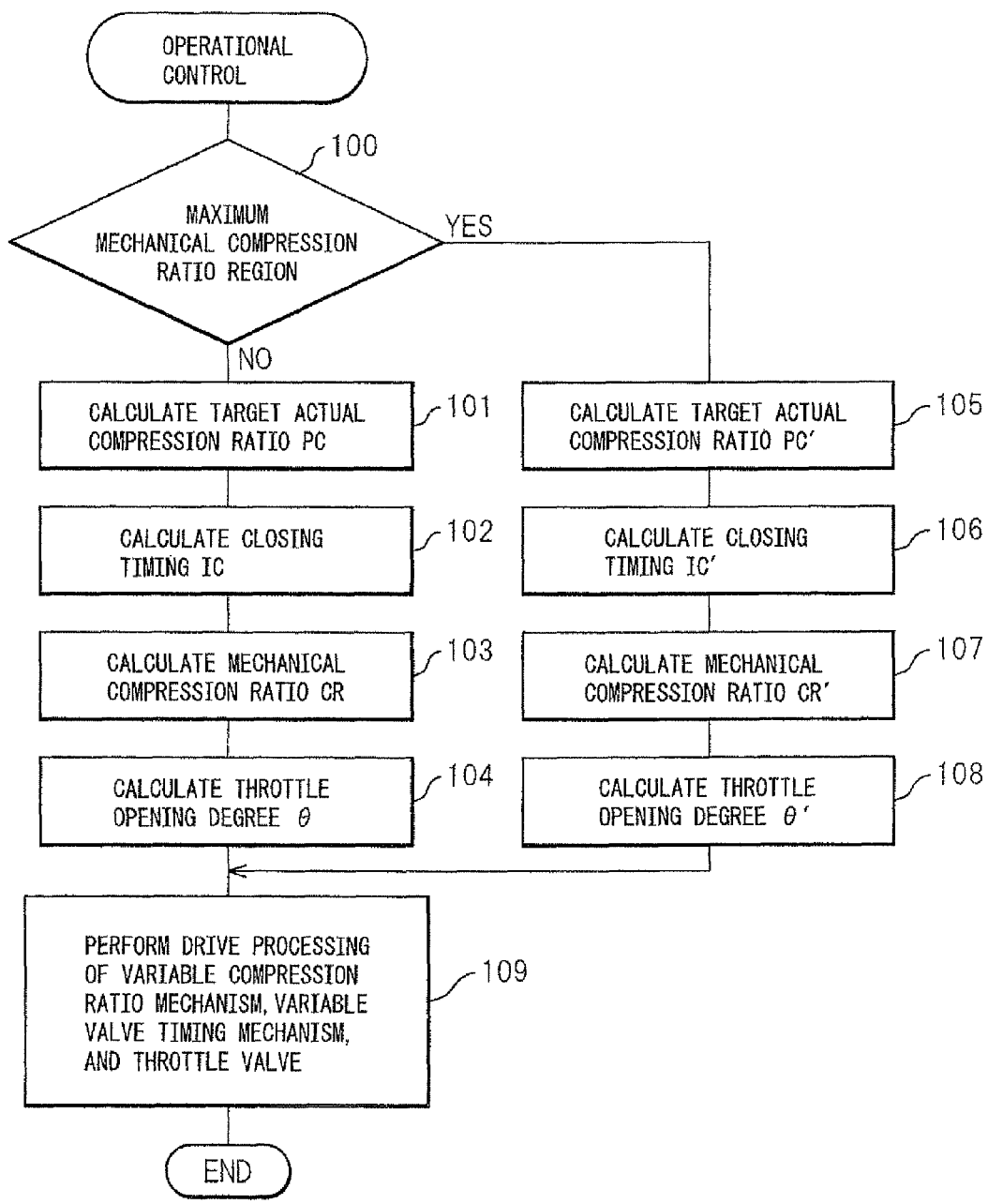
FIG. 13 is a flowchart for operational control.

In a first embodiment according to the present invention, combustion is performed under the second air fuel ratio when the mechanical compression ratio becomes the maximum mechanical compression ratio. More specifically, in this first embodiment, combustion is performed by the second air-fuel ratio at the load region where the mechanical compression ratio is maximum when at a second air-fuel ratio. FIG. 13 shows an operational control routine for executing this first embodiment.

Referring to FIG. 13, first, at step 100, it is judged if the load region is one in which the mechanical compression ratio becomes the maximum mechanical compression ratio under the second air-fuel ratio, that is, lean air-fuel ratio. When not a load region where the mechanical compression ratio becomes the maximum compression ratio, the routine proceeds to step 101, where the combustion is performed under the first air-fuel ratio, for example, a stoichiometric air-fuel ratio.

That is, at step 101, the target actual compression ratio is calculated. Next, at step 102, the closing timing IC of the intake valve 7 is calculated from the map shown in FIG. 14(A). That is, the closing timing IC of the intake valve 7 required for feeding the intake air amount that is required when the air-fuel ratio is stoichiometric into the combustion chamber 5 is stored as a function of the engine load L and engine speed N in the form of the map as shown in FIG. 14(A) in advance in the ROM 32. The closing timing IC of the intake valve 7 is calculated from this map.

Next, at step 103, the mechanical compression ratio CR is calculated. Next, at step 104, the opening degree of the throttle valve 17 is calculated. The opening degree θ of this throttle valve 17 at the time of stoichiometric air-fuel ratio is stored as a function of the engine load L and engine speed N in the form of a map as shown in FIG. 14(B) in advance in the ROM 32. Next, at step 109, the variable compression ratio mechanism A is controlled so that the mechanical compression ratio becomes the mechanical compression ratio CR, the variable valve timing mechanism B is controlled so that the closing timing of the intake valve 7 becomes the closing timing IC, and the throttle valve 17 is controlled so that the opening degree of the throttle valve 17 becomes the opening degree θ.

As opposed to this, at step 100, when it is judged the load region is one where the mechanical compression ratio becomes the maximum compression ratio under the second air-fuel ratio, that is, lean air-fuel ratio, the routine proceeds to step 105, where combustion is performed under a lean air-fuel ratio. That is, at step 105, the target actual compression ratio PC' is calculated. Next, at step 106, the closing timing IC' of the intake valve 7 is calculated from the map shown in FIG. 15(A). That is, the closing timing IC' of the intake valve 7 required for feeding the intake air amount that is required when the air-fuel ratio is lean into the combustion chamber 5 is stored as a function of the engine load L and engine speed N in the form of the map as shown in FIG. 15(A) in advance in the ROM 32. The closing timing IC' of the intake valve 7 is calculated from this map.

Next, at step 107, the mechanical compression ratio CR' is calculated. Next, at step 108, the opening degree of the throttle valve 17 is calculated. The opening degree θ' of this throttle valve 17 at time of a lean air-fuel ratio is stored as a function of the engine load L and engine speed N in the form of a map as shown in FIG. 15(B) in advance in the ROM 32. Next, at step 109, the variable compression ratio mechanism A is controlled so that the mechanical compression ratio becomes the mechanical compression ratio CR', the variable valve timing mechanism B is controlled so that the closing timing of the intake valve 7 becomes the closing timing IC', and the throttle valve 17 is controlled so that the opening degree of the throttle valve 17 becomes the opening degree θ'.

Figure 16:
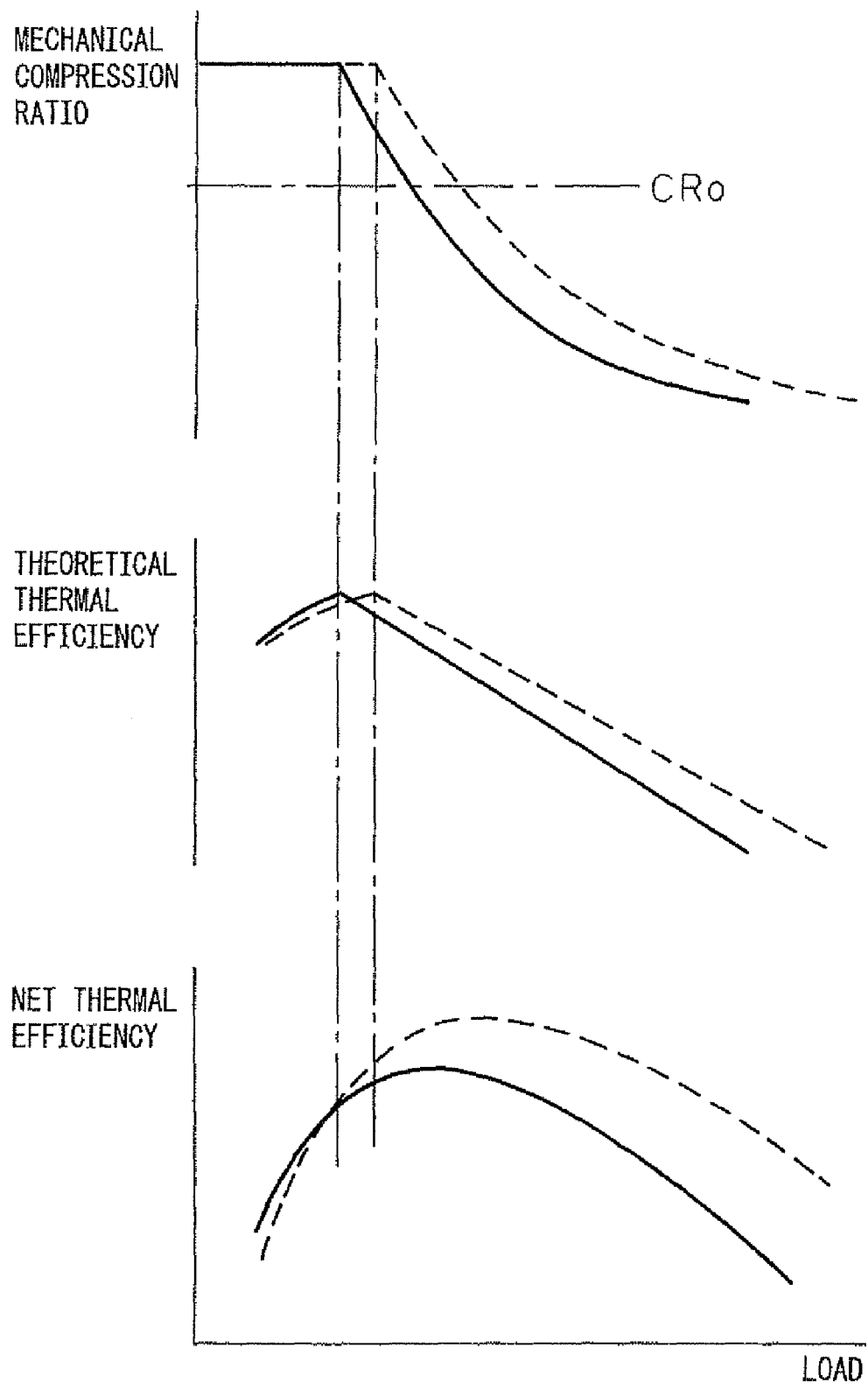
FIG. 16 is a view explaining the difference in the net thermal efficiency due to the difference in the maximum mechanical compression ratio.

If the engine speed is high, the disturbances occurring in the combustion chamber 5 become stronger, and as a result, even if the mechanical compression ratio is made high, knocking becomes harder to occur. Therefore, in the embodiment according to the present invention, the higher the engine speed, the higher the maximum mechanical compression ratio is made. FIG. 12 shows the change in the mechanical compression ratio when the engine speed is comparatively low. As opposed to this, FIG. 16 shows the changes in the mechanical compression ratio, theoretical thermal efficiency, and net thermal efficiency at the time of engine high speed. Note that, the broken line in FIG. 16 as well, similar to FIG. 12, indicates the time of the first air-fuel ratio, for example, the stoichiometric air-fuel ratio, and the solid line indicates the time of the second air-fuel ratio, that is, the lean air-fuel ratio.

As is clear from FIG. 16, if the maximum mechanical compression ratio is high, the peak of the theoretical thermal efficiency will be at the low load side, and there will be a small difference between the peak theoretical thermal efficiency load when the air-fuel ratio is stoichiometric and the peak theoretical thermal efficiency load when the air-fuel ratio is lean. As a result, as shown in FIG. 16, the region where the net thermal efficiency is high at the time of a lean air-fuel ratio in comparison to the time of stoichiometric air-fuel ratio will be an extremely low load region. In such a case where the net thermal efficiency is high only at an extremely narrow region, even if the air-fuel ratio is switched to a lean one, control will only become complex making it pointless.

That is, it is meaningful to switch to a lean air-fuel ratio when the maximum mechanical compression ratio becomes small to a certain extent and load region, in which the net thermal efficiency becomes high when switching an air-fuel ratio to a lean air-fuel ratio, becomes larger to a certain extent. Therefore, in a second embodiment according to the present invention, when the maximum mechanical compression ratio is lower than a predetermined reference value $CR_0$ (FIG. 16), combustion is performed by the second air-fuel ratio, that is, the lean air-fuel ratio when the mechanical compression ratio becomes the maximum mechanical compression ratio, and when the maximum mechanical compression ratio is higher than the predetermined reference value $CR_0$, combustion is performed by the first air-fuel ratio, for example, the stoichiometric air-fuel ratio when the mechanical compression ratio becomes the maximum mechanical compression ratio.

Figure 17:
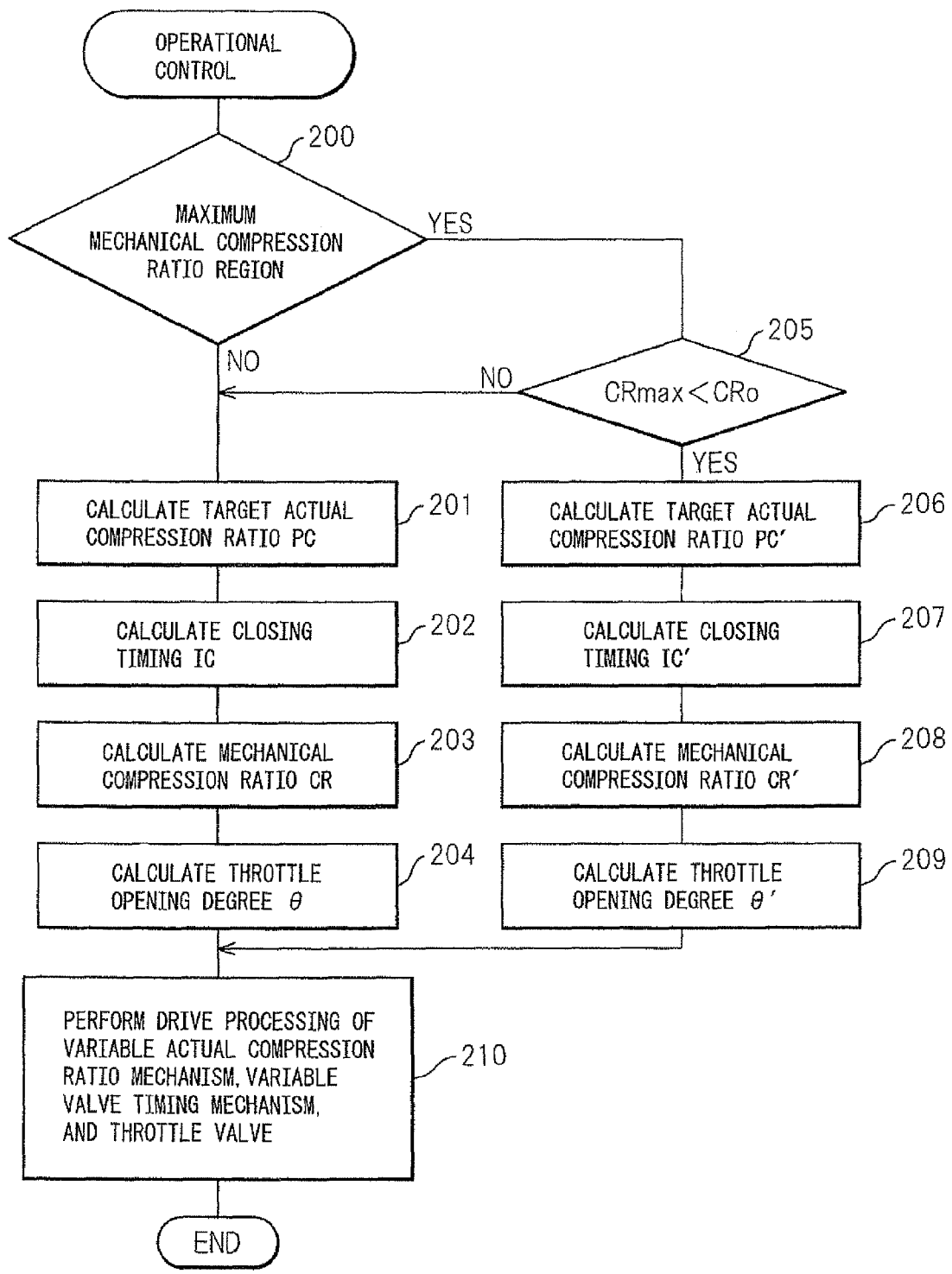
FIG. 17 is a flowchart for operational control.

FIG. 17 shows the operational control routine for executing this second embodiment.

Referring to FIG. 17, first, at step 200, it is judged if the load region is one where the mechanical compression ratio is the maximum mechanical compression ratio under the second air-fuel ratio, that is, lean air-fuel ratio. When not a load region where the mechanical compression ratio is the maximum compression ratio, the routine proceeds to step 201, where combustion is performed under the first air-fuel ratio, for example, stoichiometric air-fuel ratio.

That is, at step 201, the target actual compression ratio PC is calculated. Next, at step 202, the closing timing IC of the intake valve 7 is calculated from the map shown in FIG. 14(A). Next, at step 203, the mechanical compression ratio CR is calculated. Next, at step 204, the opening degree θ of the throttle valve 17 is calculated from the map as shown in FIG. 14(B). Next, at step 210, the variable compression ratio mechanism A is controlled so that the mechanical compression ratio becomes the mechanical compression ratio CR, the variable valve timing mechanism B is controlled so that the closing timing of the intake valve 7 becomes the closing timing IC, and the throttle valve 17 is controlled so that the opening degree of the throttle valve 17 becomes the opening degree θ.

As opposed to this, at step 200, when it is judged if the load region is one in which the mechanical compression ratio is the maximum compression ratio under the second air-fuel ratio, that is, a lean air-fuel ratio, the routine proceeds to step 205, where it is judged if the maximum mechanical compression ratio Crmax is less than the reference value $CR_0$. At this time, when it is judged that $CRmax \geq CR_0$, the routine proceeds to step 201, where combustion is performed under a stoichiometric air-fuel ratio. As opposed to this, when it is judged that $CRmax < CR_0$, the routine proceeds to step 206, where combustion is performed under a lean air-fuel ratio.

That is, at step 206, the target actual compression ratio PC' is calculated. Next, at step 207, the closing timing IC' of the intake valve 7 is calculated from the map shown in FIG. 15(A). Next, at step 208, the mechanical compression ratio CR' is calculated. Next, at step 209, the opening degree θ of the throttle valve 17 is calculated from the map as shown in FIG. 15(B). Next, at step 210, the variable compression ratio mechanism A is controlled so that the mechanical compression ratio becomes the mechanical compression ratio CR', the variable valve timing mechanism B is controlled so that the closing timing of the intake valve 7 becomes the closing timing IC', and the throttle valve 17 is controlled so that the opening degree of the throttle valve 17 becomes the opening degree θ'.

In this regard, as explained above, in the superhigh expansion ratio cycle shown in FIG. 8B, the expansion ratio is made 26. The higher this expansion ratio the better, but as will be understood from FIG. 7, it is possible to obtain a considerably high theoretical thermal efficiency if 20 or more even for the practically usable lower limit actual compression ratio $\epsilon=5$. Therefore, in the present invention, the variable compression ratio mechanism A is formed so that the expansion ratio becomes 20 or more.

On the other hand, as shown by the broken line in FIG. 9, it is possible to control the intake air amount without regard to the throttle valve 17 by advancing the closing timing of the intake valve 7 as the engine load becomes lower. Therefore, expressing this so that both the case shown by the solid line in FIG. 9 and the case shown by the broken line are covered, in the embodiment of the present invention, the closing timing of the intake valve 7 is made to shift as the engine load becomes lower in the direction away from the intake bottom dead center BDC until the limit closing timing $L_2$ enabling control of the intake air amount fed into the combustion chamber.

The invention claimed is:

1. A spark ignition type internal combustion engine comprising:
   a variable compression ratio mechanism able to change a mechanical compression ratio;
   a variable valve timing mechanism able to control a closing timing of an intake valve, and
   a controller that is configured to control the variable compression ratio mechanism and the variable valve timing mechanism so that:
   the mechanical compression ratio is made higher at an engine low load operation side than at a time of engine high load operation,
   the mechanical compression ratio is gradually reduced at an engine high load operation side as the engine load becomes higher,
   a first combustion by a first air-fuel ratio and a second combustion by a second air-fuel ratio larger than the first air-fuel ratio are selectively performed,
   the first combustion is performed under the first air-fuel ratio at the high load operation side, and
   at the engine low load operation side, the second combustion is performed by the second-air fuel ratio when the mechanical compression ratio is lower than a predetermined reference value, and the first combustion is performed by the first air-fuel ratio when the mechanical compression ratio is higher than the predetermined reference value.

2. The spark ignition type internal combustion engine as claimed in claim 1, wherein the mechanical compression ratio becomes a maximum mechanical compression ratio at the engine low load operation side, and when the maximum mechanical compression ratio is less than the predetermined reference value, the second combustion by the second air-fuel ratio is performed when the mechanical compression ratio becomes the maximum mechanical compression ratio, and when the maximum mechanical compression ratio is higher than the predetermined reference value, the first combustion by the first air-fuel ratio is performed when the mechanical compression ratio becomes the maximum mechanical compression ratio.

3. The spark ignition type internal combustion engine as claimed in claim 1, wherein the mechanical compression ratio is made to increase until the maximum mechanical compression ratio as the engine load decreases, the mechanical compression ratio is held at the maximum mechanical compression ratio at an engine low operation side of a load lower than an engine load where the mechanical compression ratio becomes the maximum mechanical compression ratio, and the mechanical compression ratio is gradually made to decrease as the engine load increases at an engine high load operation side of a load higher than an engine load where the mechanical compression ratio becomes the maximum mechanical compression ratio.

4. The spark ignition type internal combustion engine as claimed in claim 3, wherein the expansion ratio at the time of the maximum mechanical compression ratio is 20 or more.

5. The spark ignition type internal combustion engine as claimed in claim 1, wherein the first air-fuel ratio is a stoichiometric air-fuel ratio, and the second air-fuel ratio is a lean air-fuel ratio.

* * * * *